UNITED STATES PATENT OFFICE.

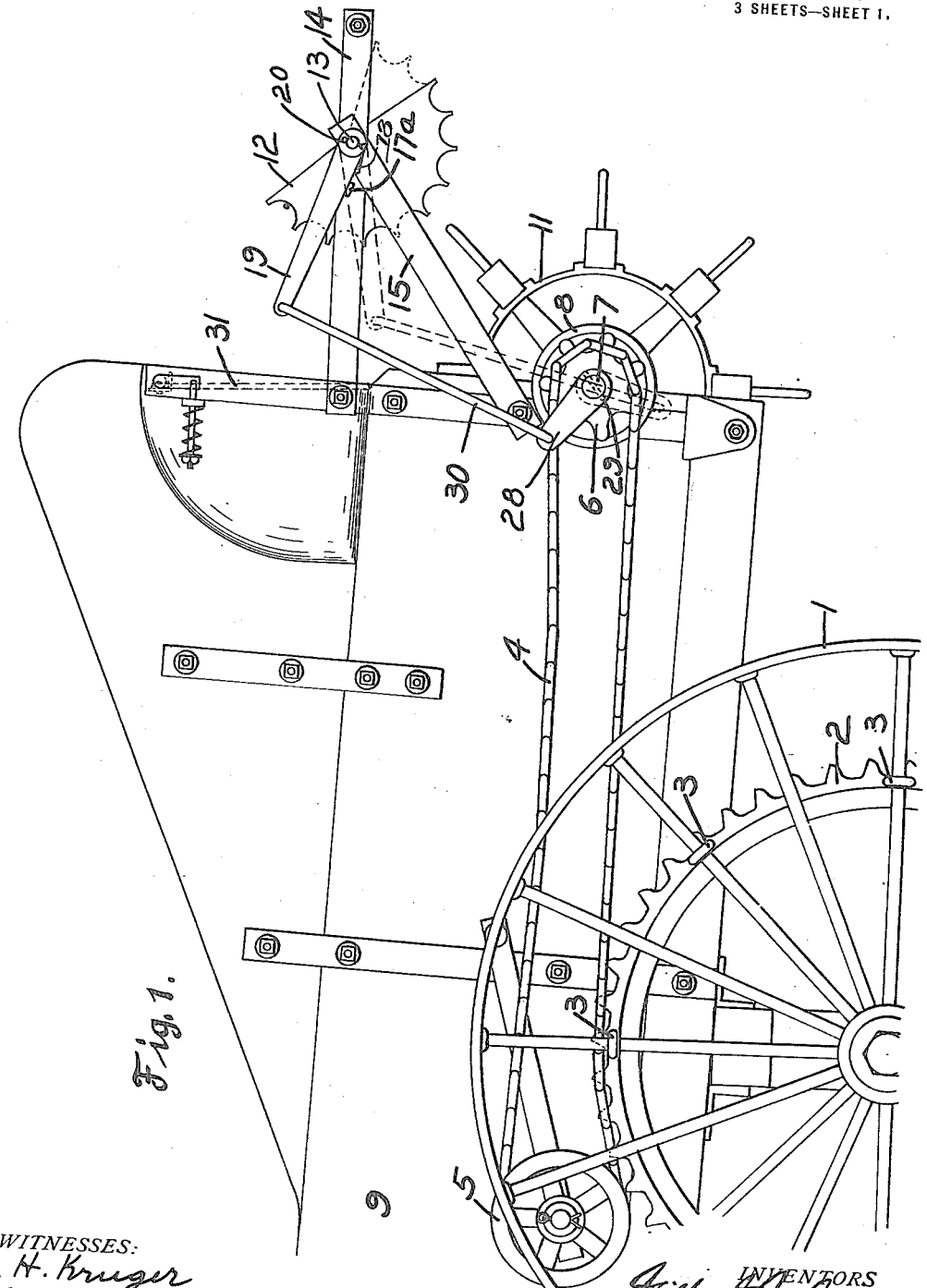

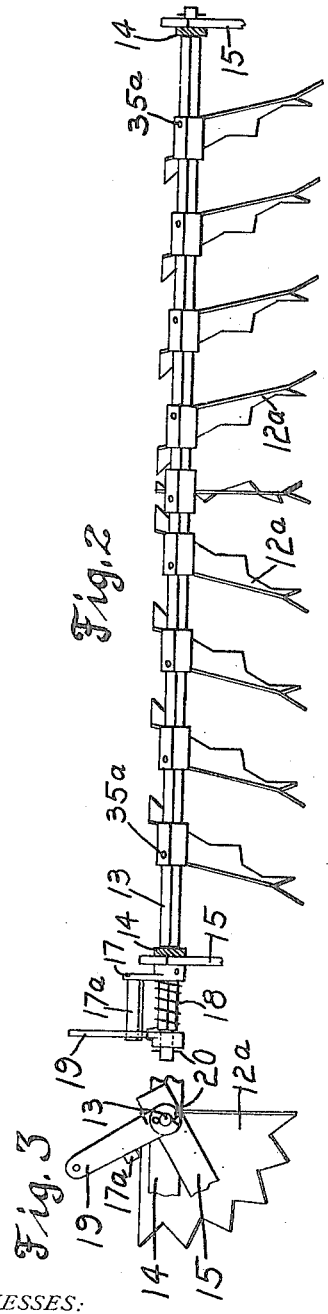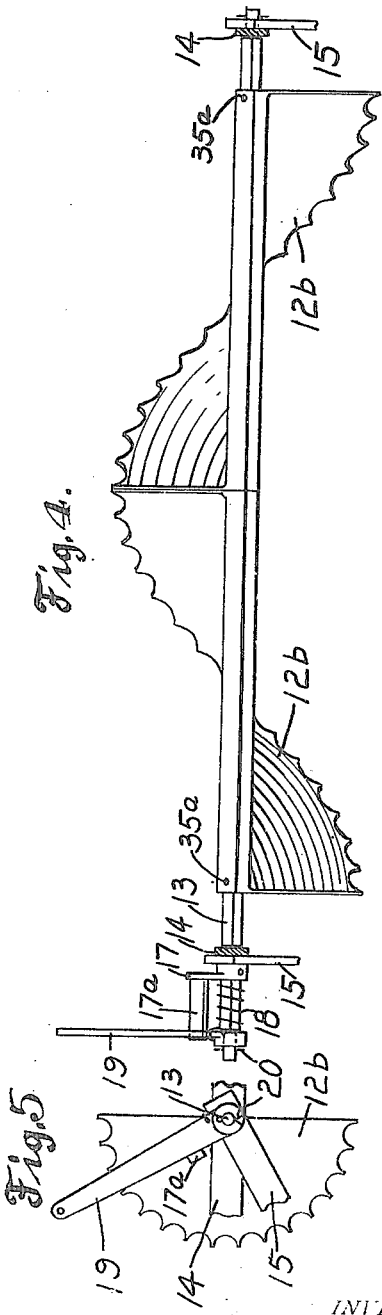

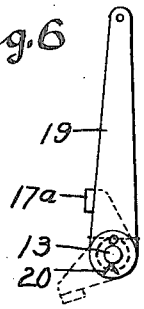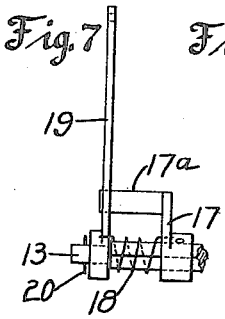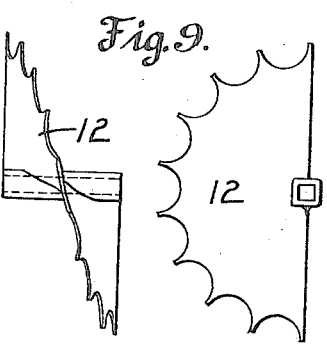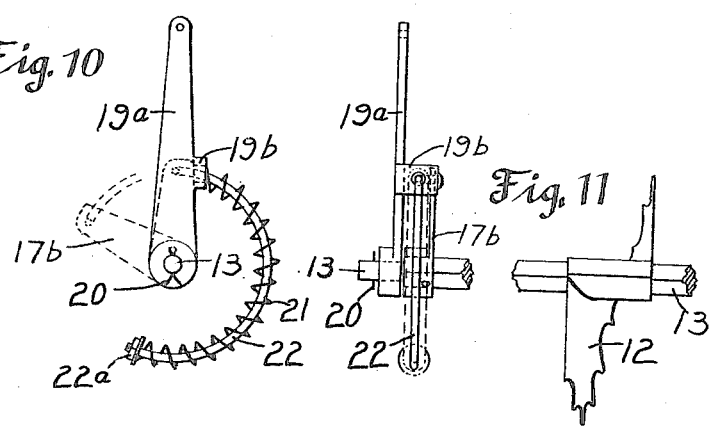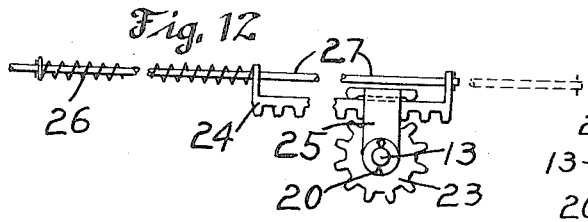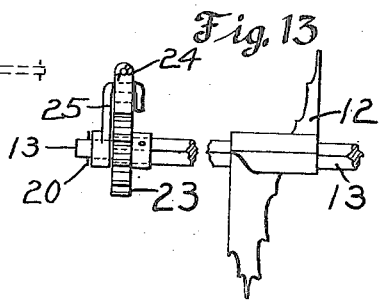

WILLIAM N. WHITELY AND WILLIAM N. WHITELY, JR., OF SPRINGFIELD, OHIO; WILLIAM N. WHITELY, JR., ADMINISTRATOR OF SAID WILLIAM N. WHITELY, DECEASED, ASSIGNOR INDIVIDUALLY AND AS ADMINISTRATOR, BY MESNE ASSIGNMENTS, TO INTERNATIONAL HARVESTER COMPANY OF NEW JERSEY, A CORPORATION OF NEW JERSEY.

MANURE-SPREADER.

1,187,952.     Specification of Letters Patent.     Patented June 20, 1916.

Application filed January 26, 1911, Serial No. 604,907. Renewed April 21, 1915. Serial No. 22,767.

*To all whom it may concern:*

Be it known that we, WILLIAM N. WHITELY and WILLIAM N. WHITELY, Jr., citizens of the United States, residing at Springfield, in the county of Clark and State of Ohio, have invented certain new and useful Improvements in Manure-Spreaders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in manure spreaders.

Our object is to provide the machine with lateral distributers mounted for vibration on the discharge side of the cylinder in the line of discharge of the manure from the bed, for the purpose of refining and spreading the manure in a wide swath, evenly distributed and uniformly disintegrated.

In the drawings, Figure 1 is a side view of a rear portion of a manure spreader showing one method of driving the cylinder and distributers from the main driving and supporting wheel. Fig. 2 is a rear view of one form of distributer having plane surfaces or flat sides set obliquely to the line of discharge from the bed. Fig. 3 is an end view of the distributers shown in Fig. 2. Fig. 4 is a rear view of distributers having a coarse shaped screw segment form. Fig. 5 is an end view of the distributers shown in Fig. 4. Fig. 6 is a side view of the flexible drive arm mounted on the distributer shaft. Fig. 7 is a rear view of the parts shown in Fig. 6, showing the flexible connection of the drive arm to the distributer shaft. Fig. 8 is a front view of one of the screw segment shaped distributers shown in Fig. 1. Fig. 9 is a side view of same. Fig. 10 is a side view of another form of flexible connection of the drive arm with the distributer shaft. Fig. 11 is a rear view of Fig. 10 with a portion of the distributer shaft and one of the distributers added to show the relation of the parts. Fig. 12 is a side view of another form of driving device for the shaft of the distributers by means of a spur gear and rack with flexible connection to the connecting rod which transmits motion from the cylinder shaft. Fig. 13 is an end view of Fig. 12 with a portion of the distributer shaft and one distributer added.

Our invention is applicable to any type of manure spreader but is preferably shown in connection with a manure spreader of the combined wagon and spreader type.

The driving and supporting wheel 1 preferably rotates on a fixed axle (not shown) and has a ring sprocket 2 fastened to the spokes by clips 3. A main drive chain 4 has its lower strand engaging with the upper periphery of the sprocket 2 and is supported at front by an idler 5, and having its rear end passing around a driven sprocket 6 which is loosely mounted on the cylinder shaft 7. Suitable ratchet and pawl drive connection between the sprocket 6 and shaft 7 to allow backing and turning is inclosed at 8 and need not be particularly described.

The main drive from the wheels to the cylinder shaft is preferably a double drive construction, both wheels driving, and as the driving mechanism is the same on both sides of the machine but one need be shown or described.

The manure bed 9 is preferably of the "wagon box" type having a tight board bottom.

Any suitable means having the capacity of feeding the manure fast or slow to the cylinder 11 at the will of the operator, whereby the quantity of manure spread on a given area of land may be varied to suit the needs of the land, may be employed. The lateral distributers are preferably mounted over and on the manure discharge side of cylinder 11 as shown in Fig. 1 and may be of any suitable size, shape or arrangement. The distributers 12 are preferably employed, as shown in Figs. 8 and 9. Those shown at 12ª in Figs. 2 and 3 and at 12ᵇ in Figs. 4 and 5 are modified forms of distributers.

The distributers 12 may be mounted for vibration in any suitable manner. As shown there is a shaft 13 mounted over and on the main discharge side of cylinder 11 and supported by pairs of brackets 14 and 15 which are bolted to the sides of the bed 9. In order to stiffen these brackets and keep them in place a distance tube 16 is placed between the rear ends of the brackets 14 and a bolt passes through the tube 16 and the ends of brackets 14 and is secured by a nut so that a firm support is obtained for shaft 13. Shaft 13 is preferably square with round ends to form bearing surfaces in the brackets 14 and 15. Near one end of the shaft 13 is rigidly mounted a crank 17 which has positive drive connection with the shaft 13 and there is a spring 18 loosely surrounding the shaft 13 beyond the crank 17, one end of the spring 18 engaging with the underside of crank 17 while its opposite end engaging with the drive arm 19 which is preferably loosely journaled on the shaft 13. The drive arm 19 is retained in place by a pin or cotter 20 or other suitable device. An ear 17ª of crank 17 bears against the inner side of drive arm 19 so that preferably the distributers are positively driven by the spring in one direction yieldingly, that being the direction away from the cylinder 11 and they are normally returned by means of contact of the crank 17 and drive arm 19. In case an unbreakable obstacle is discharged by cylinder 11 this construction allows the distributers to yield back and away from normal relation to the cylinder so that injury to the mechanism of the spreader is prevented.

In Figs. 10, 11, 12, and 13 are shown modified means of allowing automatic yielding of the distributers. In Fig. 10 the modified drive arm 19ª has an integral ear 19ᵇ against which the modified crank 17ᵇ bears and there is a spring 21 mounted on a spring rod 22 carried by 17ᵇ and this spring 21 is interposed between an adjustable nut 22ª on the rod 22 and the ear 19ᵇ of the arm 19ª so that the distributers may have the yielding function previously described. Another modification of both means for actuating the distributers 12 as well as permitting yielding is found in Figs. 12 and 13. In Fig. 12 is a spur gear 23 preferably rigidly mounted on the shaft 13 and there is a rack 24 which engages with the gear and drives it. 25 designates a housing which holds the rack 24 and gear 23 in mesh, this housing 25 is assembled with the parts 23 and 24 and the assembly is then slipped on the end of the shaft 13 and the gear 23 is then made fast to the shaft 13 while the housing 25 remains loosely mounted on shaft 13 to hold the parts 23 and 24 in place and at the same time the housing will let the play of the shaft be undisturbed. A spring 26 is mounted on a rod 27 and is interposed between the rod 27 and rack 24 so that yielding of the distributers may be secured. It is possible by the use of a rack and spur gear to give greater movement of a vibratory or semi-rotatable path of travel to the distributers 12 than by crank motion and as it may be desirable to give increased travel to the distributers 12 we have shown one means for this purpose.

In Fig. 1 is shown the means of driving or vibrating the distributers 12. There is a crank 28 rigidly connected to the shaft 7 by a pin 29 or other device, a connecting rod 30 is connected pivotally to this crank 28 and to the end of the drive arm 19 or 19ᵇ as the case may be so that the distributers are vibrated back and forth or agitated as the cylinder revolves. It is understood that the connecting rod 27 is pivoted to crank 28 when the rack and gear is used.

Any suitable means may be employed to drive the distributers as will give vibratory or agitative motion and they may be driven from the cylinder shaft or other source of power as may be desired. The distributers 12, 12ª or 12ᵇ or other form suitable for the purpose may have their peripheries formed in the circumference or periphery of a cylinder and may have serrations or teeth on their edges so that as they travel back and forth the same relative proximity of the peripheries of cylinder 11 and distributers is maintained in order to continuously present refining elements to the surface of the cylinder in all normal positions.

The distributers 12 may be mounted on shaft 13 in any suitable way. As shown they have hubs adapted to slip over the shaft 13 and are then held by pins or keys 35 or 35ª as shown in Fig. 2. The edges tear the manure and the sides may be of any suitable shape to cause lateral distribution. The distributers may be arranged in series or otherwise as desired.

31 represents one form of rake or detainer over the cylinder, as any form or arrangement of detainer may be used it is not necessary to particularly describe same, it being understood that any suitable means for this purpose may be used in connection with our invention.

The cylinder 11 may be of any suitable kind and mounted and driven in any suitable manner not necessary to be further described.

We claim,

1. In a manure spreader, in combination, a manure bed, a discharge cylinder located at one end of said bed, lateral distributers having sides which are obliquely disposed to the path of discharge and mounted for vibration over and on the manure discharge side of said cylinder, means whereby said distributers are vibrated in the line of discharge whereby the manure is distributed laterally in a wide swath over the ground, the portions of the peripheries of said distributers adjacent to said cylinder maintaining substantially the same proximity to the periphery of said cylinder in all positions of normal vibration, said distributers also constituting means whereby the manure is disintegrated by the coöperative action with the discharge cylinder.

2. In a manure spreader, in combination, a manure bed, a discharge cylinder located at one end of said bed, a shaft mounted over said cylinder on the manure discharge side of said cylinder, lateral distributers mounted on said shaft whereby the manure is distributed laterally, means whereby said distributers are vibrated in the line of discharge, said lateral distributers having their portions adjacent to the periphery of said discharge cylinder formed in the circumference or periphery of a cylinder whereby the adjacent peripheries of said distributers and of said cylinder maintain approximately a fixed relation to each other in all positions of normal movement, the peripheries of said lateral distributers adjacent to said discharge cylinder also forming means whereby the manure is disintegrated.

3. In a manure spreader, in combination, a manure bed, a discharge cylinder located at one end of said bed, two sets of lateral distributers having sides which are obliquely disposed to the path of discharge and mounted for vibration over and on the manure discharge side of said cylinder, means whereby said distributers are vibrated in the line of discharge, one set of said distributers having sides exposed to the path of discharge and obliquely arranged to throw the manure to the right from about midway of the width of said cylinder and the other set oppositely arranged to throw the manure to the left from about midway of the width of said cylinder, the edges of said lateral distributers adjacent to said cylinder adapted to refine the manure by the coöperation of the teeth of said cylinder.

4. In a manure spreader, in combination, a manure bed, a discharge cylinder located at one end of said bed, a series of lateral distributers mounted for vibration over and on the manure discharge side of said cylinder, means whereby the said distributers are vibrated back and forth over said cylinder in the line of discharge from said cylinder, said distributers being formed in the shape of a segment of a screw to the right and left from about midway of the width of said cylinder and having serrations on their peripheries whereby the portions of the peripheries of said distributers which are adjacent to said cylinder maintain substantially the same space between the teeth of said cylinder and the serrations of said distributers while in normal motion, the sides of said distributers laterally distributing the manure beyond the width of said bed.

5. In a manure spreader, in combination, a manure bed, a discharge cylinder located at one end of said bed, a series of lateral distributers mounted for vibration in the line of discharge over and on the manure discharge side of said cylinder, the sides of said distributers obliquely disposed to the path of discharge, whereby the manure is distributed laterally in a wide swath, the peripheries of said distributers being formed in the circumference or periphery of a cylinder and having teeth or projections whereby the manure is refined and the space between the said distributers and said cylinder's periphery is maintained substantially the same in all positions of normal movement.

6. In a manure spreader, in combination, a manure bed, a discharge cylinder located at one end of said bed, lateral distributers having their faces opposed to the action of the discharge cylinder obliquely disposed and mounted for vibration dischargeward of said cylinder, means to vibrate said distributers in the line of discharge from said cylinder, the edges of said distributers formed whereby a pre-determined space is maintained during normal movement between the adjacent peripheries of said distributers and of said cylinder, the edges of the distributers constituting means for refining the manure, a device interposed between said means for vibrating said distributers and the distributers themselves whereby they may yield back when opposed by unbreakable obstacles thrown out of said bed to let the obstacles pass out and which returns said distributers to normal position.

7. In a manure spreader, in combination, a manure bed, a discharge cylinder located at one end of said bed, obliquely sided lateral distributers mounted for forward and rearward vibration over and on the manure discharge side of said cylinder, means for vibrating said distributers in the line of discharge from said cylinder whereby the manure is distributed laterally, the portions of said distributers adjacent to said cylinder formed whereby the peripheries of said distributers and of said cylinder coact in close proximity to disintegrate the manure between the peripheries of said cylinder and of said distributers in all positions of normal movement.

8. In a manure spreader, in combination, a manure bed, a discharge cylinder located at one end of said bed, means coöperating with said cylinder whereby the manure is detained and refined, a shaft pivotally mounted at either side of said spreader, lateral distributers mounted for vibration over and on the manure discharge side of said cylinder, on said shaft, means for vibrating said distributers in the line of discharge from said cylinder whereby the manure is distributed laterally, the oblique portions of said distributers adjacent to said cylinder formed whereby their oblique portions next to said cylinder and the peripheries of said distributers and of said cylinder coact in close proximity to disintegrate the manure in all positions of normal movement.

9. In a manure spreader, in combination, a manure bed, a discharge cylinder located at one end of said bed, lateral distributers mounted for vibration over and on the manure discharge side of said cylinder, means for vibrating said distributers in the line of discharge from said cylinder comprising a distributer shaft mounted for vibration over and on the manure discharge side of said cylinder and a gear connected to said shaft and a rack engaging said gear and a connecting rod on which said rack is mounted having driving connection with the shaft of said cylinder and a device interposed between said connecting rod and said distributer shaft whereby said distributers may yield out of the way of unbreakable obstacles and be returned to a normal working position without disturbing the working relation of the parts.

10. In a manure spreader, a manure bed, a discharge cylinder at one end thereof, distributers having faces laterally and obliquely disposed to the path of discharge, and means for vibrating said distributers whereby the manure is distributed laterally in a wide swath over the ground.

11. In a manure spreader, a discharge cylinder, and a vibratory screw-like distributer for distributing manure from said cylinder in a wide swath over the ground.

12. In a manure spreader, a discharge cylinder, and a reciprocatory screw-like distributer for distributing manure from said cylinder in a wide swath over the ground, said distributer having a toothed periphery to disintegrate the manure.

13. In a manure spreader, a discharge cylinder, and a vibratory distributer adjacent thereto having means to produce a sawing action on the manure being moved by said cylinder.

14. In a manure spreader, a discharge cylinder, and oppositely arranged reciprocatory screw-like distributers adjacent said cylinder for distributing manure in different directions in a wide swath over the ground.

In testimony whereof, we affix our signatures, in presence of two witnesses.

WILLIAM N. WHITELY.
WILLIAM N. WHITELY, Jr.

Witnesses:
C. H. Kruger,
G. W. Branton.